United States Patent [19]

Steinmetzer et al.

[11] Patent Number: 4,728,067
[45] Date of Patent: Mar. 1, 1988

[54] COMPOSITE LEG-SUPPORT

[75] Inventors: Karl Steinmetzer; Laszlo Schetl, both of Jönköping, Sweden

[73] Assignee: Stilexo Industrial AB, Skillingaryd, Sweden

[21] Appl. No.: 933,525

[22] PCT Filed: Mar. 13, 1986

[86] PCT No.: PCT/SE86/00110
§ 371 Date: Nov. 7, 1986
§ 102(e) Date: Nov. 7, 1986

[87] PCT Pub. No.: WO86/05373
PCT Pub. Date: Sep. 25, 1986

[30] Foreign Application Priority Data

Mar. 13, 1985 [HU] Hungary ............... 933/85

[51] Int. Cl.⁴ ............................. F16M 11/32
[52] U.S. Cl. .................... 248/188.7; 248/163.1
[58] Field of Search ............... 248/188.7, 188.1, 158, 248/159, 163.1

[56] References Cited

U.S. PATENT DOCUMENTS

| | | | |
|---|---|---|---|
| 3,078,063 | 2/1963 | Frankl | 248/188.7 |
| 3,139,256 | 6/1964 | Dodds | 248/188.7 |
| 3,151,830 | 10/1964 | Giacomini | 248/188.7 |
| 3,153,524 | 10/1964 | Greenfield et al. | 248/188.7 X |
| 3,236,485 | 2/1966 | Staples | 248/188.7 X |
| 3,424,423 | 1/1969 | Hampton | 248/188.7 X |
| 3,479,973 | 11/1969 | Bartlett et al. | 248/188.7 X |
| 3,705,704 | 12/1972 | Textoris | 248/188.7 |
| 3,877,669 | 4/1975 | Ambasz | 248/188.7 |
| 4,511,108 | 4/1985 | Ponzellini | 248/188.7 |
| 4,598,892 | 7/1986 | Franckowiak et al. | 248/188.7 X |

Primary Examiner—Ramon O. Ramirez
Attorney, Agent, or Firm—Hayes, Davis & Soloway

[57] ABSTRACT

A composite leg-support with high loadability having a tubular vertical shank (4) and legs (1) which are releasably affixed to the shank and extending essentially horizontally and radially therefrom. The ends of the legs (1) pointing toward the center of the shank (4) have extensions (2, 3, 13, 18) which protrude into the interior of the shank (4), through openings (5) distributed along the periphery of the shank (4), and they engage in a force-locking manner with profiled discs (6, 10, 15) contained in the shank (4). The discs (6, 10, 15) are pressed towards one another by means of screw (11) extending along the longitudinal axis of shanks (4) and it is accessible from the lower end portion thereof.

7 Claims, 16 Drawing Figures

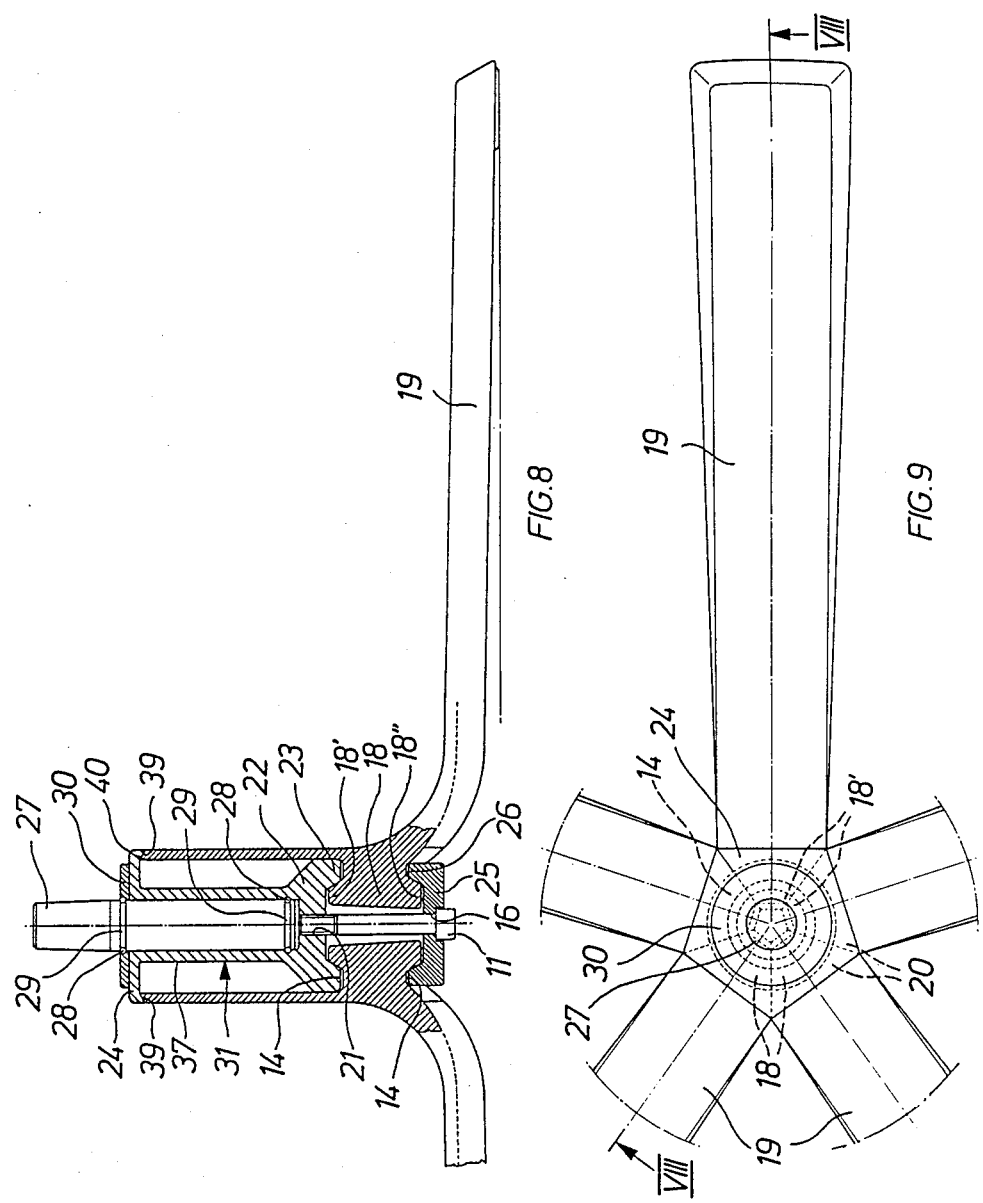

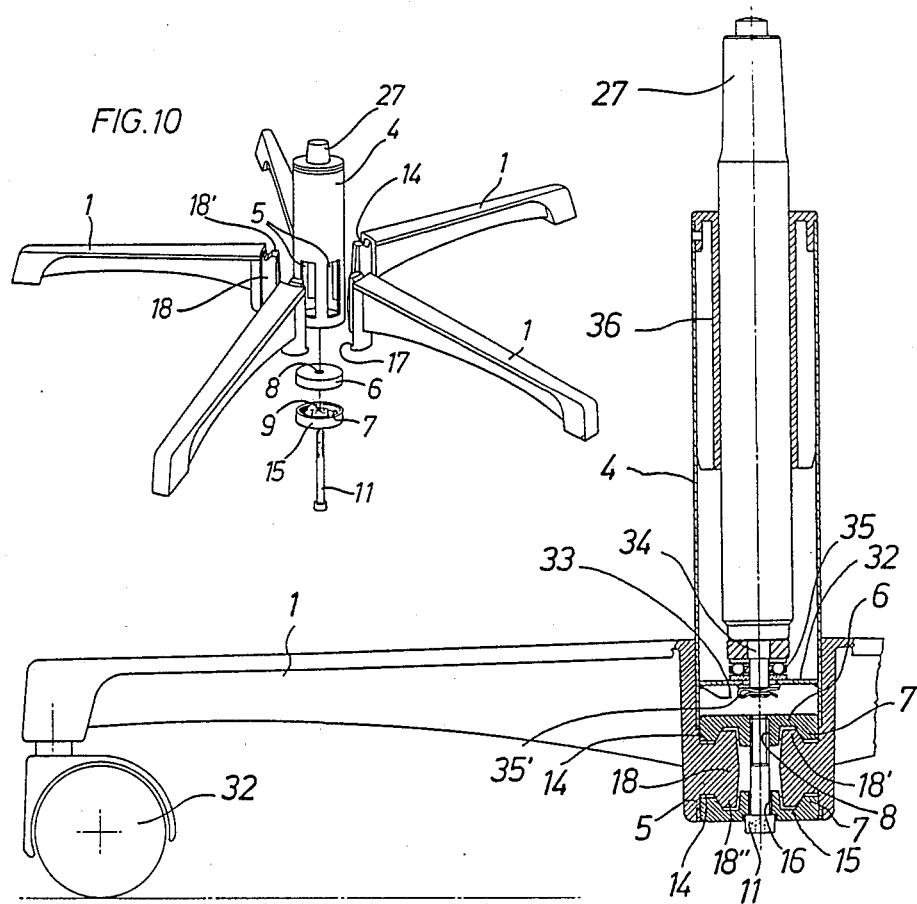
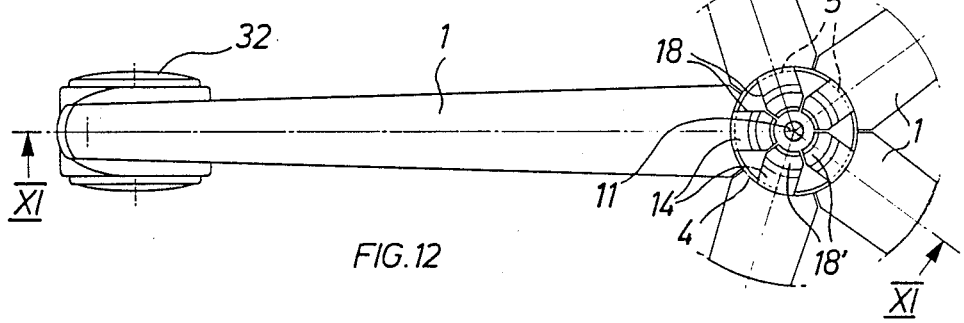
FIG.10
FIG.11
FIG.12

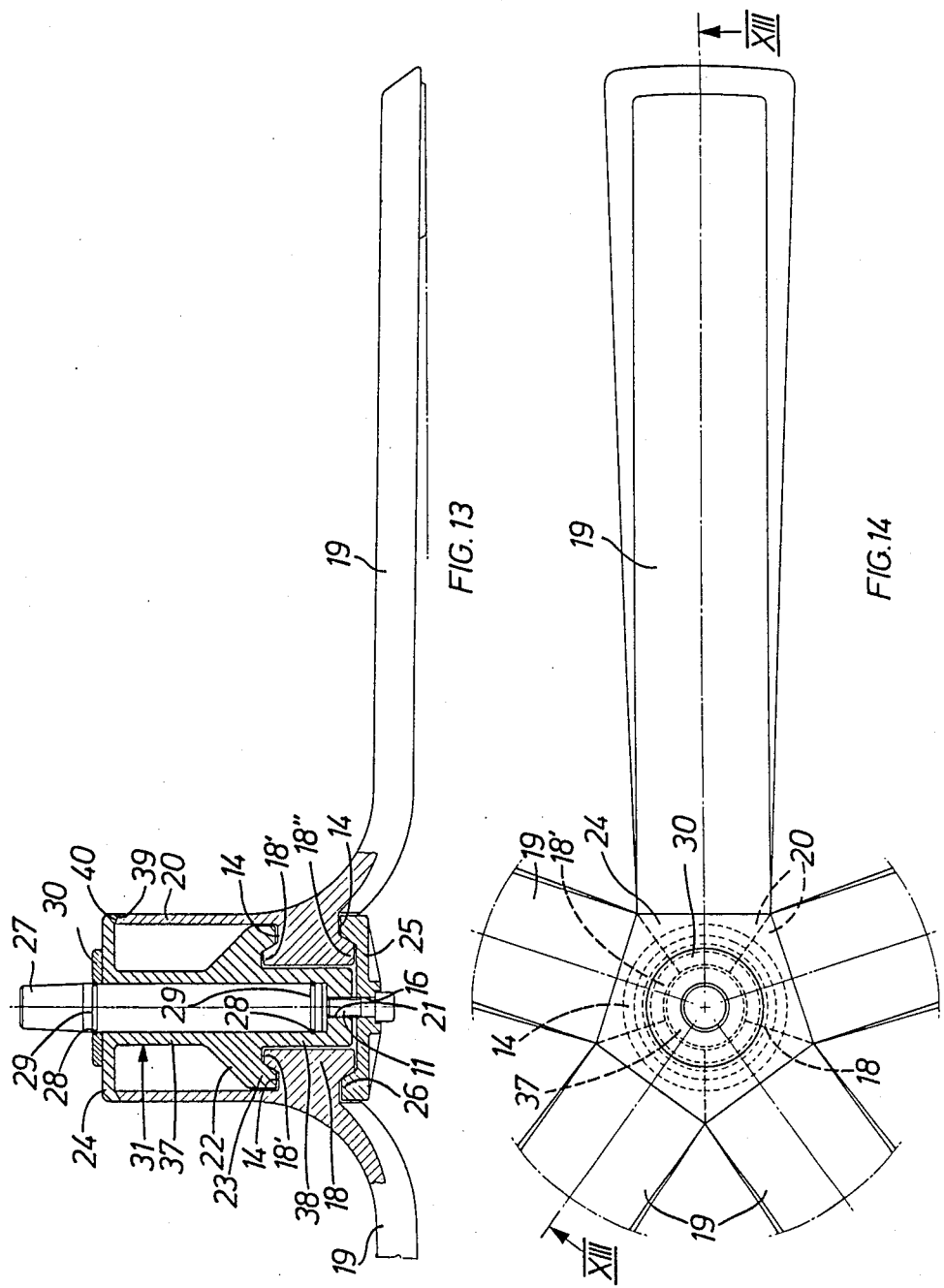

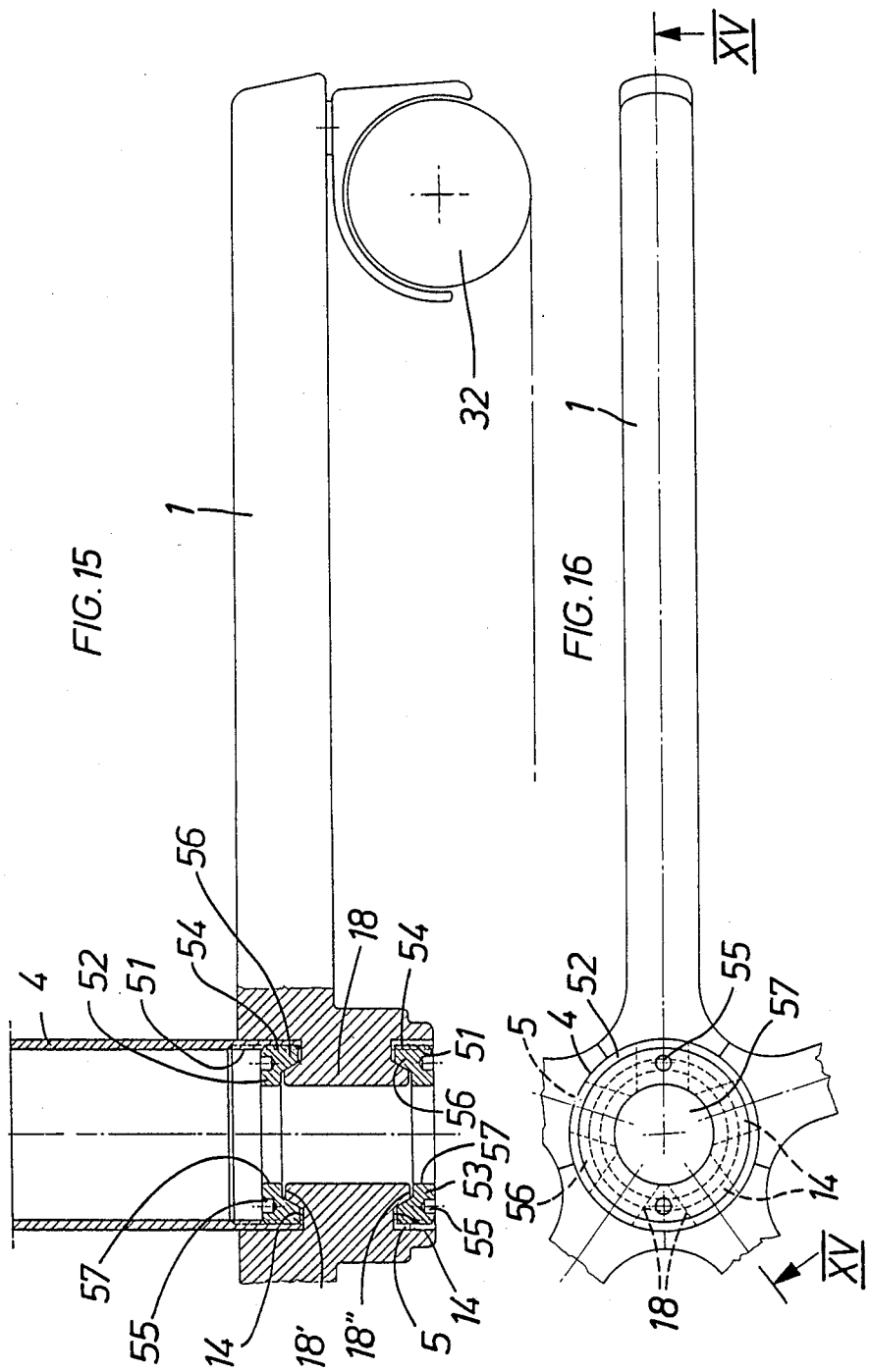

COMPOSITE LEG-SUPPORT

The invention relates to a composite leg-support, in particular for sitting furniture, small tables and office furniture.

From practice several structural embodiments are known, thus e.g. swivel chairs, tables, TV-stands are supported in this way, the common characteristic of which lies in that generally three to five legs are affixed to a vertical shank made of a tube of circular or polygonal cross-section, perpendicularly or approximately perpendicularly and horizontally thereto and the other ends of said legs are supported by the floor. One group of said leg-supports cannot be disassembled at all; these the legs are welded to the shank or the shank and the legs are formed as a monolithic casting. In dependence of the load to be expected, these leg-supports are made of cast-iron, aluminium or steel with proper strength characteristics. As a consequence, the leg-support has a considerable weight, the solution is not at all material-saving and in spite of the heavy thick construction useful life of the leg-support is not too long.

A further disadvantageous feature of known leg-supports lies in the considerable space requirement, increasing costs in course of transport and, if leg-supports are transported so that shanks and/or legs are intertwined, surfacial finish may become damaged and this way of transport may result in an aesthetically inferior product.

Another increasingly dominant group of leg-supports is formed by leg-supports which can be assembled and disassembled, respectively. With these solutions in course of storage and transport shanks can be grouped separately from furniture and legs, while the legs having the shape of an elongated prism can be stored and transported in an optional form and number, with a good utilization of space.

It can be generally stated that legs of the leg-supports are bent to the desired shape from a sheet-material having been cut previously to the required shape and so that the cross-section of the leg is showing a reversed U-profile. On the end of the leg directed to the shank a thick metal plate is welded for the sake of locking, in which one or generally two threaded bores are machined. This bore or the bores can be found on the connecting place of the shank and leg too, and when assembling the leg-support the leg is pressed onto the shank by means of screws having been introduced into the shank inwardly.

The disadvantage of this solution lies in that assembly is a time-consumptive process requiring live labor, in addition, screwed connections become loose under load in course of time resulting in the damage of screwed joints and lability of the leg-support and, in a worse case, in falling out of the leg and thus in an accident.

Leg-supports used to be assembled—due to the relatively narrow diameters of shank—with screws with socket head opening, which can be tightened with a so-called hexagonal wrench not staying always at disposal.

In the U.S. Pat. No. 3,801,054 a furniture support is disclosed, wherein the sides of the legs with a reversed U-profile forming the flanks of the U-shape are extended and bent to the right angle, they are bearing up against one another and overlapping each other, while the overlapped sides are interwelded. In compliance with the extended sides, on the mantle of the shank of the leg-support two longitudinal slots each are formed, the number of which corresponds to the number of legs, into which the extended sides of the legs are pushed-in from below and so, that the upper edge of the elongated sides should impact on the bottom of the slots. Now, the overlapped and welded end of the extended sides lies in the inside of the shank. A tumbler-shaped disc is also forming part of the furniture supporting armature, the outer diameter of which corresponds to the inner diameter of the shank of the leg-support and the mantle of which is formed by vertical tongues, the number of which corresponds to the number of the legs. When the disc is located in the shank, said tongues get below the overlapped ends and bear up against the inner surface of the shank of the leg-support, thus preventing radial displacement of the legs, while axial displacement of the legs is prevented by the disc having been pulled into the shank by means of a screw and fixed therein. Although, at this solution the legs are not affixed by screws, and assembly is restricted to the location of the legs in the slots, positioning of the disc, fitted in the proper place first manually and thereafter with a screw, experiences have shown, that the leg-support is unable to transmit the load permanently and evenly to the ground and in course of use cracks or breaks appear in the material of the disc, and the shanks, i.e. the legs, these damages can be merely delayed by using thicker materials, but cannot be fully eliminated.

The above mentioned deficiencies appear to a greater extend at recently produced leg-supports which are made, in compliance with internationally accepted trends, of aluminium and the lowest limit-value of loadability of a leg-support amounts to 1200 kp.

The objective of our invention is partly to eliminate said deficiencies, partly to develop a composite leg-support which can be easily assembled, assembly does not require special qualifications; furtheron, by tightening one single screw or nut a stable connection can be obtained; its useful life is long and loadability excesses 1200 kp.

A further objective lies in that transportability of the leg-support could be advantageously influenced by its low weight, and relatively small space-requirement in a disassembled state.

According to the invention the task set was solved by means of a leg-support of the aforementioned kind, which is characterized by the presently claimed features.

According to the invention this embodiment was further developed in such a way that on the shank of the leg-support, in the range of one end thereof, there is at least one row of openings arranged at an equal mutual distance along the periphery of the shaft, the number of which is proportional with the number of legs, a lug formed on the extended side of U-flank of the leg with the cross-section of a reversed U-profile and pointing upwards reaches into the inside of the shank, where it is engaging with the inner flange of a profiled disc having been arranged in the shank from below; in the profiled disc, which is bearing against the inner surface of the shank with its outer mantle-surface a central through bore is formed, in which a screw is screwed, which compresses said profiled disc and another disc supported on the other side of the lug and provided with a center hole, as well as another lug having been formed on the extended side of the leg and pointing upwards is engaged with the lower flange of the shank.

By this solution it can be ensured that the leg can be fitted into the proper opening of the shank with one single flick of the hand, while after having tightened the screw, the leg is fixed and cannot fall out, while the lug engaging with the lower flange of the shank of the leg prevents the turning out of the leg within the given range of loadability.

At an expedient embodiment of the invention the inner flange of the profiled disc is conically shaped and is engaging with a properly bevelled edge of the upper lug of the leg. At this embodiment by tightening the screw the profiled disc is pressing the leg radially and permanently to the shank.

It is considered as advantageous, if the head of the screw compressing the disc is bearing against the disc lying next to the end of the shank through a spring washer, because in such a manner it can be avoided that the screwed connection should become loose and the leg should turn out from the shank in a loaded state.

The task set was solved furtheron by means of a composite leg-support, wherein the leg is a lightmetal-cast and the end of which facing the shank is formed with a concave surface in compliance with the curvature of the shank and in the line of the longitudinal axis of said surface there are two prismatic extensions being thinner than the width of the leg and formed from the same material as the leg itself and on the opposite sides thereof arcuated conical grooves are formed; in the range of one end of the shank and along the periphery of the shank two rows of openings are formed below each other at an equal mutual distance, the number of openings corresponding to the number of the legs, through said openings the extensions of the legs reach into the inside of the shank; in the shank two profiled discs facing one another are so arranged, that the discs with their inner conical flanges are engaging in a force-locking manner with the conical grooves of the extensions of the leg, furtheron, in the disc lying farther from the end of the shank a central through bore is formed, while in the disc lying nearer there is a central hole to be found, the diameter of which is larger than the diameter of the bore, and the leg and the shank are interconnected by means of the disc having been pressed together by a screw in a shape- and force-locking manner. Compared to the embodiment previously described, the loadability of this embodiment is far larger, in addition assembly is simple, not requiring special qualifications.

According to a further developed embodiment of the invention the two prismatic extensions of the leg below one another are united to one single elongated extension, the thickness of which is changing symmetrically to the transverse bisector of the extension in direction of the longitudinal axis of the shank while the two openings lying below one another on the shank are widened to one single rectangular elongated opening. Such a configuration of the extension enables the uniform transfer of considerably large loads through the shank and legs to the ground.

At a further advantageous embodiment of the invention on the curved surface of the leg made of a light-metal cast being in contact with the shank a flange is formed from the leg-material the width of which corresponding to the wall-thickness of the shank, which flange is bearing against the end of the shank in a force-locking manner in the assembled state. This flange establishes a mechanical strength of connection between the shank and legs and protects the tubular shank from premature fatigue and damaging.

As already mentioned for the assembly of the legsupport according to the invention neither special qualification nor special tools are required, as shank and legs can be assembled by tightening the interconnecting mounting screw with a simple fork wrench or a box-spanner to the required extent.

Formation and size of the profiled discs and the screw are independent of the number of legs, defined by the number of openings in the shank. In the range of connection of the shank and legs the leg-support according to the invention can be considered as an element of uniform strength, accordingly, the support of the leg-support can be chosen respectively determined always quickly and with a high safety for the load to be expected.

The invention will be described in detail by means of some preferred embodiments serving as examples, by the aid of the drawings enclosed, wherein.

Figure 6:
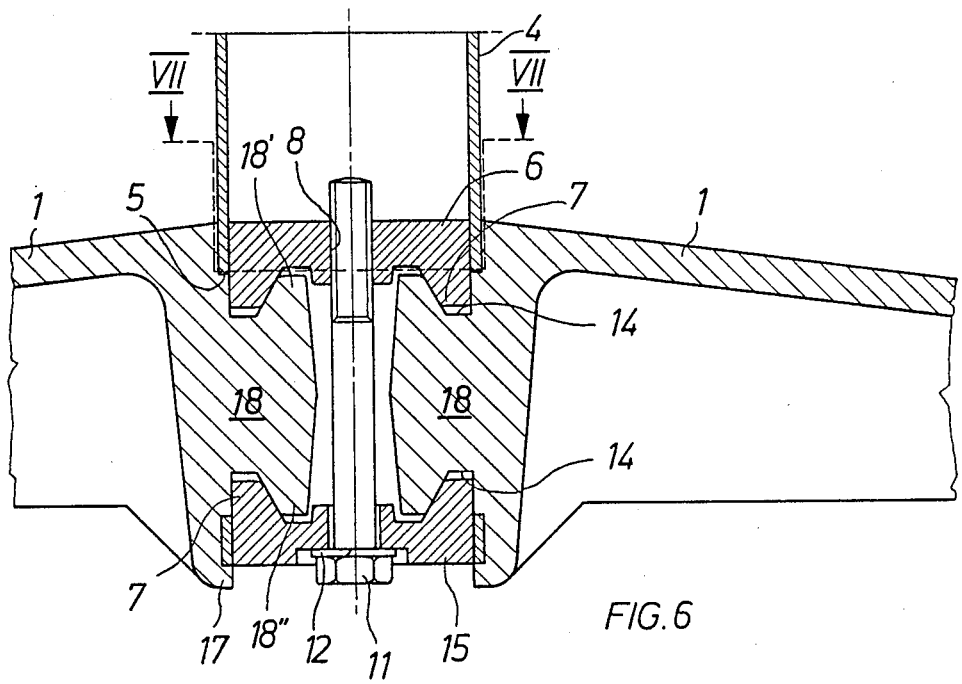
Figure 7:
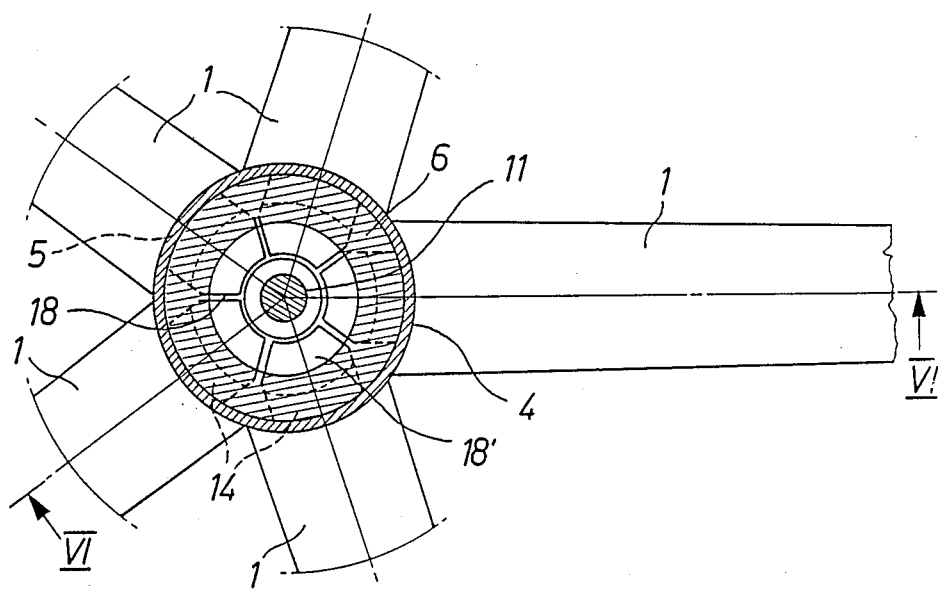

FIG. 6 is a longitudinal section of a further embodiment of the composite leg-support, FIG. 7 is a sectional view of the leg-support according to FIG. 6 taken along the line VII—VII, FIG. 8 is a sectional view of a further developed embodiment of the leg-support, FIG. 9 is a top view of the leg-support of FIG. 8, FIG. 10 is an oblique, exploded view of the leg-support of FIG. 6, FIG. 11 is a sectional view of another embodiment of the invention including a swivelling shaft and its bearings, FIG. 12 is a top view of the leg-support of FIG. 11 with the swivelling shaft removed, FIG. 13 is a sectional view of an embodiment of the invention similar to the one shown in FIG. 8, FIG. 14 is a top view of the embodiment shown in FIG. 13, FIG. 15 is a further embodiment of the invention including an internally threaded shank interacting with externally threaded profiled discs, and FIG. 16 is a top view of the leg-support of FIG. 15.

Figure 1:
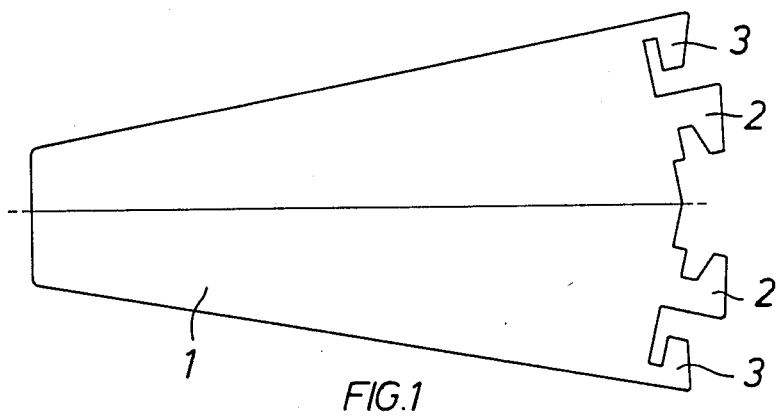
FIG. 1 is a top view of a metal sheet cut to size but not having been bent forming the leg of a first embodiment of the leg-support according to the invention.

FIG. 1 shows the top view of the iron or steel sheet already cut to size but not having been bent yet, which when bent along its symmetry line, forms a leg 1 with a roughly reversed U-shaped profile. Thickness of the iron or steel sheet serving as the material of the leg 1 depends on the loadability of the leg-support to be produced, changing in practice between 0.5 and 3 mm. After having bent the iron or steel sheet lower lugs 3 and upper lugs 2 arrive at the same height.

Figure 2:
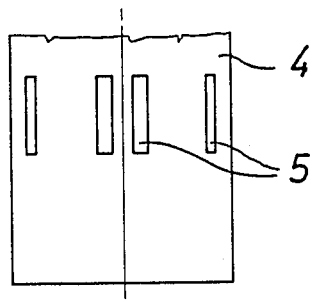
FIG. 2 is a view of a part of the shank belonging to the leg as seen in FIG. 1.

FIG. 2 illustrates a detail of the lower end of a shank 4 of the leg-supppport. On the shank 4 longitudinal openings 5 are formed for receiving the lugs 2 of the leg 1. As every single leg 1 is provided with two lugs 2, accordingly the number of the openings 5 is double the number of the legs.

Figure 3:
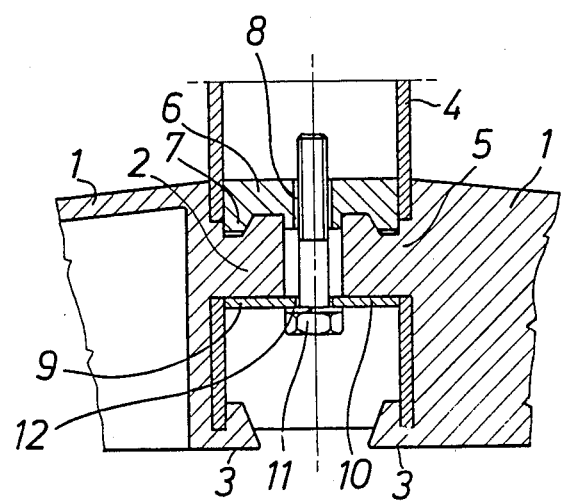
FIG. 3 shows a longitudinal section of a part of a first embodiment of the leg-support according to the invention.

In case of FIG. 2 the openings 5 are distributed at an equal mutual distance by pairs of the shank 4. The distance between the openings 5 and the lower end of the shank 4 is selected so that in the connected state of the shank 4 and the leg 1 the lugs 3 of the leg 1 are engaging with the lower flange of the shank 4, as it becomes obvious from FIG. 3, showing a longitudinal section of the legs 1 and shank 4 of the leg-support, wherein the plane of section was arranged in the line of the lateral walls of the legs 1. The lugs 2 of the legs 1 intrude into the inside of the shank 4 through the openings 5 and engage in a force-locking manner with the conical flange 7 of a profiled disc 6 having been arranged previously therein. This becomes possible by the bevelled end of the lugs 2 being in contact with the flange 7. The profiled disc 6 is provided with a threaded central through bore 8, into which a screw 11 is screwed in, which presses a disc 10 provided with a central hole 9 against the underside of the lugs 2.

In course of assembly we insert the profiled disc 6 into the shank 4, thereafter the lower lugs 3 of the legs 1 are brought in engagement with the lower flange of the shank 4, while the lugs 2 are allowed to pass through the openings 5. Thereafter the profiled disc 6—which is kept at a height that does not prevent engagement of the lugs 2—is allowed to fall back, as a consequence, the conical flange 7 thereof will engage with the lugs 2 of the legs 1. In the next step the spring washer 12 and the disc 10 are placed onto the screw 11 one after the other, thereafter the screw 11 is tightened first by hand and afterwards it is screwed with a proper tool into the threaded bore 8 of the disc 6. In course of this manipulation the disc 6 is unable to turn, as it is bearing against the inner surface of the shank 4 with its outer mantle-surface, while its inner conical flange 7 is supported by the bevelled edges of the lugs 2 and establishes a force-locked connection therewith. In such a manner the profiled disc 6 is pressing the legs 1 - simultaneously all of them—against the shank 4 and affixes them so, thus being unable to dislocate.

Figure 4:
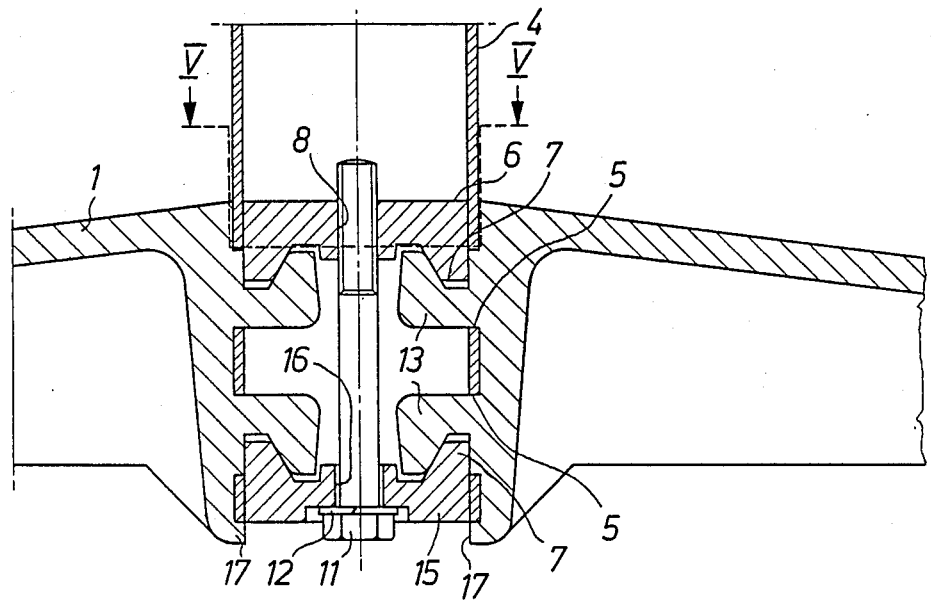
FIG. 4 is a longitudinal section of a second embodiment of the leg-support according to the invention.
Figure 5:
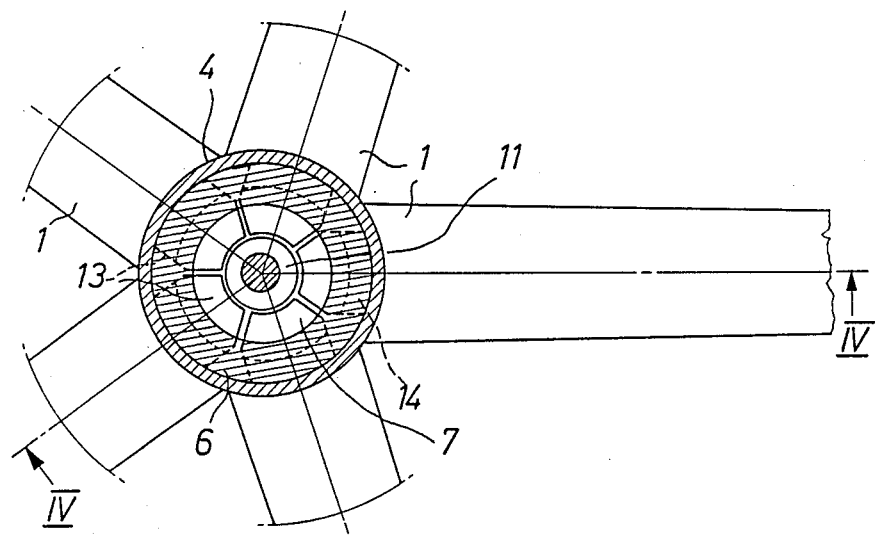
FIG. 5 is a sectional view of the leg-support according to FIG. 4, taken along the line V—V.

In FIG. 4 a longitudinal section of a detail of an embodiment of the composite leg-support according to the invention is to be seen, in which the legs 1 are made of a lightmetal casting. It can be well seen, that on the shank 4 two rows of openings 5 are formed below one another, the size of which enables introduction of extensions 13—made of the same material as the leg 1 itself—into the interior of the shank 4. As becomes obvious from FIG. 5, the end of the leg 1 facing the shank 4 has a concave surface complying with the curvature of the shank 4, while the extensions 13, having approximately the shape of a prism and being thinner than the width of the leg 1, are formed below one another along the longitudinal axis of the concave arched surface. On the opposite side of the extensions 13 there is formed a conical, arcuated groove 14, into which the internally conical flange 7 of the respective profile discs 6, 15 extends. The diameter of a through hole 16 of the profiled disc 15 is dimensioned to allow the passage of the screw 11 which can be screwed into the threaded bore 8 of the profiled disc 6. At the embodiment illustrated here between the head of the screw 11 and the profiled disc 15 there is inserted a spring-washer 12, which prevents the displacement of the screw 11. On the curved surface of the leg 1, on the lower part thereof, being in contact with the shank 4, a flange 17 is formed of the material of the leg 1, the width of which corresponding to the wall thickness of the shank 4, said flange 17 is bearing against the end of the shank 4 in a force-locking manner, when the shank 4 and the leg 1 are in the assembled state.

Similarly to the leg 1, profiled discs 6 and 15 are made of aluminium of proper strength. It is clearly visible that the side of the extensions 13 facing the screw 11 is not parallel with the longitudinal axis of the shank 4, but the extensions become thicker in direction towards one another. This formation ensures increased strength of the extensions 13.

In course of assembling the leg-support first of all the disc 6 is inserted into the shank 4, which is kept at a height which does not prevent introduction of the extensions 13 of the legs into the shank 4 through the openings 5. After having properly positioned the extensions 13 the internal conical flange 7 of the profiled discs 6 and 15 are brought in engagement with the curved conical groove 14 of the extensions 13, the screw 11 is allowed to pass through the disc 15.

In particular, the embodiment shown in FIGS. 6. and 7 is well suitable for keeping respectively transmitting 1200 to 1300 kp weight-force to the ground, by applying a construction made of aluminium and having five legs in accordance with the safety prescriptions of several countries.

It is possible to use a self-cutting screw as screw 11, in this case diameter of the through bore in the profiled bore 6 has to be selected so, that the screw should establish a force-locking but at the same time releasable connection.

In FIG. 8 we can see an example of such a leg-support with a modified shank 31 integrated with an upper disc 22, where an outer or additional shank of the leg-support is formed by lightmetal cast legs 19, having a reverse U-shape resting on the ground, said legs being bent. The bent end sections 20 of the legs 19 form in the assembled state a cylindrical or polygonal surface, which in this way forms an outer shank of the leg-support. The legs 19 have a thinner elongated extension 18, cast in one piece with the legs, and which is thinner than the width of the leg and reaches into the interior of said outer shank. At the upper and lower edge of the extension there is formed an arcuated conical groove 14. The internal conical grooves of the extensions are interconnected by means of the inwardly conical flange 23 of the disc 22, which is situated in the interior of the outer shank formed by the legs and is provided with a central bore 21.

The top flange 24 of the modified shank interconnects the ends 20 of the legs to a shape-lock, while the lower conical groove 14 of the extensions are interconnected by an upwardly directed conical flange 26 of a disc 25, which is provided with a central hole.

The legs 19 and the disc 23, 25 are mounted by means of a screw 11 in a shape-locked and force-locked manner. A metal shaft 27, which is in connection with the furniture in question, is mounted in the central bore of the disc and is rotable.

The end sections 20 in the assembled state form a vertical shank. This shank may have a cylindrical surface, for instance a circular cylinder or some other shape, for instance with the cross-section of a regular polygon.

The shaft 27 is locked in axial direction by means of lock rings 28 located in channels 29 in the shaft as well as opposed channels in the disc 22 and a washer 30 respectively. The shaft 27 is surrounded by a tube or inner shank 37 of the modified shank 31, which is interconnecting the upper disc 22 and the top flange 24.

Referring now to FIG. 9 this is a top view of the embodiment in FIG. 8. It can especially be seen, that the top flange 24 has a pentagonal shape and covers the end sections 20 of the legs forming a composite vertical outer shank with pentagonal cross-section. In the Figure can also be seen the lateral walls of the extensions 18 and their sloping inner end surfaces.

Referring now to FIGS. 11 and 12 these figures exhibit an embodiment similar to the one shown in FIGS. 6, 7 and 10, and corresponding parts are given the same reference numerals. The legs 1 have a T-shaped section and are provided with rollers 32. The extensions 18 each exhibits an upwardly directed lug 18' and a downwardly directed lug 18", defining conical arcuated grooves 14. The outer wall of the groove 14 is essentially vertical and parellel with the shank 4. A shoulder part of the extensions 18 coincides with the walls of holes 5, thus defining the axial position of the legs 1. This is necessary, since in this embodiment there is not flange 17 resting against the bottom edge of the shank 4. The legs 1 are fastened to the shank 4 by means of profiled discs 6, 15 and a screw 11 in the manner described above.

In the shank 4 a radial plate 32 with a central shaft hole is resting on a shoulder 33 or is permanently mounted by welding. The plate 32 is carrying a bearing 35 for the bottom end of the shaft 27. A shaft spindle 34 penetrates the bearing and the hole in the plate and is locked under the plate by means of a cotter pin 35'. At the top end of the shank 4 the shaft is mounted in a bushing 36.

FIG. 12 shows the same embodiment as FIG. 11. In order to give a clear view of the configuration of the extensions 18, FIG. 12 does not show the shaft 27, the bushing 36, the plate 32 and the top disc 7.

FIGS. 13 and 14 disclose an embodiment similar to the one shown in FIGS. 8 and 9, however, this embodiment presents an especially low-built construction. This construction makes a total height of the leg-support of less than 200 mm (8") possible. In this embodiment there is provided a modified shank or center column 31 comprising the top flange 24, the interconnecting tube or inner shank 37 and the top disc 22 of FIG. 8 and an axial extension 38. The axial extension 38 houses the bottom end of the shaft 27. In this way, the total height is reduced while maintaining a sufficiently long bearing surface for the shaft 27. The threaded central bore 21 for the connecting screw 11 is provided at the end of the extension 38. Otherwise, this embodiment coincides with the one in FIGS. 8 and 9 and in the same way the legs 19 are kept in position by the lower disc 25 and upper disc 22 with their profiled flanges 26 and 23, respectively, as well as the top flange 24 exhibiting an inside conical, downwardly directed surface 39, which elements are interconnecting with the arcuated grooves 14 of the leg extension 18 and a complementary conical end surface 40 of the terminations or end section 20 of the legs 19.

Instead of the conical surfaces 39, 40 there may be provided other interacting profiled surfaces, which positively determines the radial positions of the end sections 20. However, the flange 24 should not exert any considerable pressure on the leg 19, the main downward pressure being provided by the disc 22 on the extension 18.

The extension 38 may also instead of the threaded bore 21 be provided with an outside thread for an internal thread in the center hole 16 of the lower disc 25. The lower disc has then engagement surfaces or means for a tightening tool. This makes an even lower total height possible. The hole for the shaft 27 may then be open or closed at the bottom.

FIGS. 15 and 16 disclose another embodiment of the invention comprising a number of legs 1 and a vertical shank 4 exhibiting at least one row of openings 5 and an internal thread 51 at both sides of said openings. The thread may be present in between the openings 5, otherwise the inside of the shank 4 may be machined to a greater diameter than the thread in this place. The internal thread 51 is accomodating an upper disc 52 and a lower disc 53, which suitable have the same configuration, thus being interchangable. The discs 52, 53 exhibit an external thread 54.

The discs are provided with arbitrary engagement means, for instance diametrically opposite holes 55 as shown in the figures. At the sides facing each other the discs are provided with profiled flanges 56 with a conical inner wall. The discs also have a central opening 57 sufficiently big to permit the passage of a tool adapted to engagement with the holes 55.

The legs 1 are essentially the same as these shown in FIGS. 11 and 12. They are provided with extensions 18 exhibiting upwardly and downwardly directed lugs 18' and 18", respectively, with a conical outer surface defining arcuated grooves 14 for accomodation of the flanges 56. In this case, the inner end of the extension 18 is preferably not prismatic. The central passage formed by the ends of the extensions 18 must be sufficiently big to permit the passage of a tool for engagement with the holes 55.

The leg-support is assembled as follows. First the upper disc 52 is screwed on to the interior thread 51 of the shank 4 up above the holes 5. The lower disc is left out or screwed in just a few turns. Then the extensions 18 of the legs 1 are inserted in the holes 5. Now, the lower disc 53 is screwed on to the internal thread 51 and the upper disc 52 is screwed downwards with a tool, until the flanges 56 of the two profiled discs 52, 53 are accomodated in the arcuated grooves 14 and rest firmly against the conical surfaces of the lugs 18' and 18" respectively. This embodiment of the invention provides a possibility for vertical height adjustment of the legs 1. This is possible since the upper disc 52 is determining the axial position of the legs. Thus, it is possible to change the position of the legs by screwing the upper disc upwards or downwards before the two discs 52, 53 are tightened against both sides of the extensions 18.

In an alternative embodiment only the upper disc is provided with an external thread. The lower disc is then pressed against the upper disc by means of a threaded bore 8 and screw 11 as described above.

In most cases it is most feasible to introduce the upper disc 7 and 52, respectively, from below. In order to hinder the disc from getting too far up in the shank out of reach for the screw 11 or a suitable tool it is feasible to install some kind of hindrance in the shank, for instance a shoulder or a stop ring, in the interior of the shank some distance above the final position of the top disc.

The embodiments described above should be considered as non-limiting examples only, and features from the various embodiments may be combined at will within the limits of the enclosed claims.

What we claim is:

1. A composite leg support having a vertical shank and at least three legs or the like arranged approximately perpendicularly to the longitudinal axis of the shank, extending radially thereto, and connected to the shank (4) in a force-locking but releasable manner, the end of each leg connectable to said shank being provide with upper and lower claw-like arresting means (2, 3, 13, 18, 18′, 18″), which are locked to the shank in position by means of an upper disc (6, 22, 52) and a lower disc (10, 15, 25, 53) or the like, these discs being provided with threaded bore means (8, 11, 21, 51, 56) for moving to and from each other thereby entering respectively into and out of engagement with upper and lower arculated grooves (14) formed by said arresting means (2, 3, 13, 18, 18′, 18″) via circumferential flanges (7, 23, 26, 56) or the like, said arresting means indirectly forming at least both sides of said grooves for absorbing outer loads in this area in a shape-force-locking manner, at least one circumferential edge of which being inclined in relation to said axis, the dimensions of at least one of said flanges being greater than those of said arculated grooves (14) in order to insure tight fitting and to compensate for material wear; the end of the legs (1, 19) facing the shank (4, 31) being formed with a curved concave surface in compliance with the curvature of the shank (4) so that in the assembled state said concave surfaces interact with the shank (4, 31), the arresting means (2, 3, 13, 18, 18′, 18″) and the discs (6, 10, 15, 22, 25, 52, 52) in the shape-force-locking manner; and a flange (17) is provided on the lower part of the curved surface of the legs (1, 19), the width of which corresponds to the wall-thickness of the shank (4), and said flange (17) bearing against the lower end of the shank (4) of the leg-support in the assembled state.

2. A composite leg-support as claimed in claim 1, characterized in, that the upper disc (22) is made as one piece with the vertical shank (4, 31) and the shank (4, 31) exhibits threaded connecting means (21) for a lower disc (25).

3. A composite leg-support as claimed in claim 2, characterized in a modified shank (31) comprising an inner shank (37) with an outside intergrated upper disc (22) and a top flange (24); and a plurality of legs (19) comprising arresting means (18, 18′, 18″) which together with the curved concave surface at the ends of the legs define at least one arcuated conical groove (14) interacting with the discs (22, 25); said legs being provided with bent end sections (20) extending vertically upwards; the conical or profiled end surfaces (40) of said end sections (20) interacting with complementary surfaces (39) of the top flange (24) in the assembled state.

4. A composite leg-support as claimed in claim 3, characterized in, that in the assembled state the bent end sections (20) of the legs (19) form an outer shank with a cylindrical or polygonal outer surface.

5. A composite leg support having a vertical shank (4, 31) and at least three legs (1, 19) or the like arranged approximately perpendicularly to the longitudinal axis of the shank, extending radially thereto, and connected to the shank (4) in a force-locking but releasable manner, the end of each leg connectable to said shank being provided with upper and lower claw-like arresting means (2, 3, 13, 18, 18′, 18″), which are locked to the shank in position by means of an upper disc (6, 22, 52) and a lower disc (10, 15, 25, 53) or the like, these discs being provided with threaded bore means (8, 11, 21, 51, 56) for moving to and from each other thereby entering respectively into and out of engagement with upper and lower arculated grooves (14) formed by said arresting means (2, 3, 13, 18, 18′, 18″) via circumferential flanges (7, 23, 26, 56) or the like, said arresting means indirectly forming at least both sides of said grooves for absorbing outer loads in this area in a shape-force-locking manner, at least one circumferential edge of which being inclined in relation to said axis, the dimensions of at least one of said flanges being greater than those of said arculated grooves (14) in order to insure tight fitting and to compensate for material wear; the shank (4, 31) is provided with a thread (51), which interacts with matching threads (54) on the upper disc (52) and the lower disc (53) and the discs (52, 53) provide engagement means 55 for a tightening tool.

6. A composite leg-support as claimed in claim 5, characterized in, that the upper disc (52) and the lower disc (53) are interchangeable and exhibit an external thread (54) as well as a central opening (57) sufficiently big to permit the passage of a tool.

7. A composite leg-support having a vertical shank (4, 31) and at least three legs (1, 19) or the like arranged approximately perpendicularly to the longitudinal axis of the shank, extending radially thereto, and connected to the shank (4) in a force-locking but releasable manner, the end of each leg connectable to said shank being provided with upper and lower claw-like arresting means (2, 3, 13, 18, 18′, 18″), which are locked to the shank in position by means of an upper disc (6, 22, 52) and a lower disc (10, 15, 25, 53) or the like, these discs being provided with threaded bore means (8, 11, 21, 51, 56) for moving to and from each other thereby entering respectively into and out of engagement with upper and lower arculated grooves (14) formed by said arresting means (2, 3, 13, 18, 18′, 18″) via circumferential flanges (7, 23, 26, 56) or the like, said arresting means indirectly forming at least both sides of said grooves for absorbing outer loads in this area in a shape-force-locking manner, at least one circumferential edge of which being inclined in relation to said axis, the dimensions of at least one of said flanges being greater than those of said arculated grooves (14) in order to insure tight fitting and to compensate for material wear; and bearing means (35, 36, 37, 38) being provided for swivelling shaft (27).

* * * * *